Nov. 29, 1932.  L. A. PARADISE  1,889,565
COMBINE
Filed Dec. 28, 1931
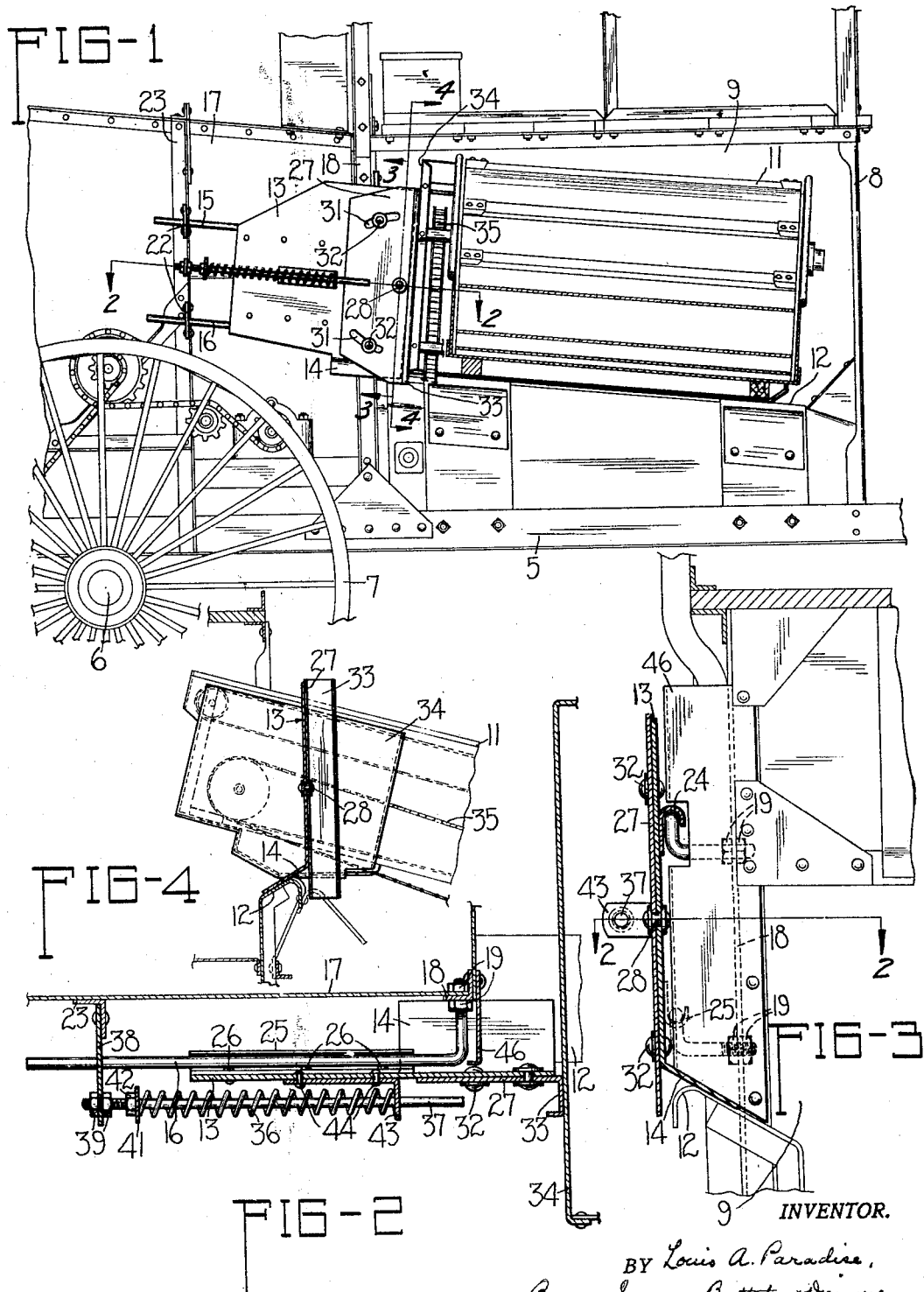
INVENTOR.
BY Louis A. Paradise,
ATTORNEYS.
WITNESS
WALTER ACKERMAN Patented Nov. 29, 1932

1,889,565

UNITED STATES PATENT OFFICE

LOUIS A. PARADISE, OF MOLINE, ILLINOIS, ASSIGNOR TO DEERE & COMPANY, OF MOLINE, ILLINOIS, A CORPORATION OF ILLINOIS

COMBINE

Application filed December 28, 1931. Serial No. 583,428.

The present invention relates to combined harvesters and threshers which cut or gather, thresh and clean the grain as a continuous operation while the implement is in motion in the field, and has more particularly to do with implements of this type in which the cutter bar edge or gathering mechanism of the harvester is raised or lowered for adjusting its height by swinging the entire harvester frame about a pivot axis extending transversely of the machine, and in which the transverse conveyor which carries the grain to the grain receiving compartment of the thresher is pivotally connected at its lower end to the harvester platform and has its upper end extending a short distance into the grain receiving compartment or feeder house, the conveyor resting on the lower margin or threshold of the opening into such compartment.

In a combine of this type the transverse conveyor delivers the grain to a rearwardly moving conveyor in the feeder house, and for this purpose it extends into the feeder house or grain receiving compartment. However, with the raising and lowering movements of the harvester platform and with the pivoting of the conveyor about the pivot axis of the harvester the conveyor reciprocates a slight amount into and out of the grain receiving compartment and at the same time moves fore and aft to some extent. In addition to such movements, the conveyor, by reason of its pivotal connection with the harvester platform, tilts or rocks about a transversely extending axis. The conveyor is itself closed at its front and rear sides but at the point where it leads into the feeder house enough space must be provided to accommodate the various movements of the transverse conveyor or elevator and this provides an opportunity for some of the grain to escape particularly between the rear side of the transverse conveyor and the rear edge of the opening into the feeder house because the rearwardly moving conveyor therein moves the grain rearwardly toward this point. The principal object of the present invention is therefore to provide an improved self-adjusting shield at this point which will automatically accommodate itself to all the above mentioned movements of the conveyor or elevator to maintain said opening closed at all times irrespective of the position the conveyor may assume in the operation of the implement.

Other objects and advantageous features will be apparent from the following description of a preferred embodiment of the invention taken in connection with the accompanying drawing, in which:

Figure 1 is a fragmentary side view of a combine with the transverse conveyor or elevator shown in section, the section being taken through a longitudinal vertical plane about midway of the length of the conveyor, and illustrating the shield in operating position;

Figure 2 is an enlarged sectional view taken on the line 2—2 of Figure 1;

Figure 3 is an enlarged sectional view taken on the line 3—3 of Figure 1 and illustrating the means for supporting the shield on the thresher unit; and Figure 4 is a vertical cross sectional view taken on the line 4—4 of Figure 1.

The combine is of conventional type as above explained, and therefore only such parts as are necessary to an understanding of the present invention have been illustrated in the drawing.

The main frame of the thresher unit as usual comprises a pair of longitudinally extending frame bars 5, one of which is illustrated in Figure 1, and is supported on an axle 6 on which a pair of wheels are journaled, one of said wheels being fragmentarily illustrated and indicated by the reference numeral 7.

The thresher unit includes a grain feeding compartment or feeder house 8 provided with an opening 9 in the side adjacent the harvester unit for receiving the upper portion of a transverse conveyor or elevator 11 which conveys or elevates the cut grain from the harvester unit to the thresher unit.

The upper portion of the transverse conveyor 11 extends a short distance into the grain receiving compartment and rests on the bottom margin or edge 12 of the opening 9 therein and shifts fore and aft and transversely with respect thereto as the harvester unit to which the lower end of the conveyor is pivotally connected is adjusted to vary the height of cut of the cutting bars carried by the harvester unit and as the harvester unit pivots with respect to the thresher unit, as when the combine passes over uneven ground. The grain is delivered from the upper end of the transverse conveyor 11 to a suitable fore and aft extending conveyor in the grain receiving compartment, which latter conveyor delivers the grain to the beaters of the thresher units, as is well understood in the art. Inasmuch as the fore and aft extending conveyor moves the grain rearwardly and as there must necessarily be some space between the rear edge of the opening into the feeder house and the transverse elevator, as pointed out above, there is some danger of leakage of grain from the feeder house or grain receiving compartment. To prevent this leakage I provide means in the form of what may be termed a shield for maintaining this opening closed at all times to prevent leakage of grain from such opening irrespective of the several movements of the conveyor above pointed out, which shield will now be described.

The shield comprises a section in the form of a longitudinally extending vertically positioned plate 13 provided with an inwardly and downwardly inclined portion 14 adjacent its forward end adapted to bear upon and slide along the bottom margin or edge 12 of the opening 9 in the grain receiving compartment 8, the inclination of the portion 14 corresponding to the inclination of said margin 12, as shown in Figures 2 and 4. The plate 13 is slidingly supported on two rods 15 and 16 extending parallel with the side wall member 17 of the thresher unit and having their forward ends turned downwardly and inwardly, as shown in Figures 2 and 3, and extending through spaced perforations provided in the vertically extending angle member 18 of the frame of the thresher unit, each of said rods being held fixedly in position in said angle member by means of a pair of nuts 19, one of which is secured on said rod on one side of the member 17 while the other is secured on the rod on the opposite side of said member. The rear ends of the rods 15 and 16 extend through perforations in spaced brackets 22 suitably fixed to the vertically extending angle member 23 of the frame of the thresher unit.

The plate 13 is supported from the rods 15 and 16 by means of two U-shaped brackets or slides 24 and 25 which respectively embrace the upper and lower surfaces of the rods 15 and 16, as shown in Figure 3, said slides being fixedly connected to the inner side of the plate 13 by rivets 26, or in any other suitable manner.

The rods 15 and 16 are supported so as to incline downwardly and forwardly in lines parallel with the downward and forward inclination of the lower edge 12 of the opening 9 in the grain receiving compartment, so that as the plate 13 slides upon the rods 15 and 16 in the operation of the implement, as hereinafter described, the downwardly and inwardly turned portion 14 of the plate will remain in contact with said edge 12.

The shield also includes a second section in the form of a vertically positioned plate 27 arranged alongside of or bearing against the plate section 13 and pivotally mounted on the plate section 13 near the forward edge thereof by means of a pivot pin or bolt 28 extending through said two plates, as shown in Figures 2 and 3. The second plate section 27 is provided with a pair of spaced arcuate shaped slots 31 through which project retaining means in the form of rivets 32 carried by the first plate section 13, and said second plate section has pivotal movement relative to said first plate section about the pivot point 28 within the limits of the slots 31, as will be readily understood. The second plate section 27 has an outwardly turned portion or member 33 which is adapted to bear against a shield 34 provided on the inner side of the transverse conveyor to protect the chain drive 35 of said conveyor. The outwardly turned portion 33 of the plate section 27 is yieldingly held against the side of the shield 34 by means of a compression spring 36, the mounting of which will now be described.

The spring 36 embraces a longitudinally extending rod 37 fixedly secured at its rear end in a bracket 38 by means of a pair of nuts 39, one of which is secured on the rod 37 on one side of the bracket and the other of which is secured on the opposite side thereof, as shown in Figure 2, said bracket being riveted to the vertically extending angle member 23 of the frame before referred to. The rear end of the compression spring 36 rests against a stop washer 41 suitably held in position on the rod 37 by means of a nut 42 threaded on said rod, see Figure 2. The forward end of the rod 37 extends through a perforation in the outwardly extending arm of an angle bracket 43 the other arm of which is secured to the plate section 13 by means of rivets 44, see Figure 2. The outwardly extending arm of the bracket 43 forms an abutment for the forward end of the spring 36. The spring 36, being held in compression between the stops 41 and 43, creates a continuous force against the stop 43 carried by the sliding plate 13 in view of the fact that the stop 41 is held in fixed position relative to the thresher frame as will be readily understood. This tends to hold the outwardly turned portion or member 33 of the plate section 27 in contact with the shield 34 of the transverse conveyor at all times.

By reason of the fact that the plate section 27 is free to pivot about the pivot pin 22 when said plate is held in contact with the shield 34 of the conveyor by the compressive action of the spring 36, the surface of the member 33 of the plate section 27 that contacts with the shield 34 of the conveyor will be forced up flush against the surface of the shield at all times no matter what angular position the conveyor may assume in its tilting movement about a transversely extending axis in the operation of the harvester unit to which said conveyor is pivotally connected on a longitudinally extending pivot axis, as above described. As the plate section 13 can slide back and forth along the rods 15 and 16, the member 33 of the plate section 27 will be maintained in contact with the shield 34 of the transverse conveyor in all positions that the transverse conveyor may assume in its fore and aft and tilting movement relative to the thresher unit in the operation of the harvester unit.

A plate 46 riveted at its inner end to the angle member 18 of the frame of the thresher unit extends outwardly from the rear edge of the opening 9 in the grain receiving compartment to a point to just clear the rivets 32. It will be seen from Figure 2 that the opening defined by the rear edge of the opening 9, the rear side of the transverse conveyor, and the lower edge 12 of the opening 9 is practically sealed against leakage of grain by means of the plate 46, the plate 13 having the inwardly and downwardly turned portion 14 which contacts with and slides on the bottom edge 12 of the opening 9 and the pivoted plate 27 having the outwardly turned portion or member 33 which contacts with the shield 26 forming a part of the transverse conveyor.

It is to be understood that the use of the word "harvester" as used in the appended claims is not to be limited to a harvester of the type which cuts the grain and delivers it to the thresher unit, but is broad enough to cover a harvester employing mechanism for gathering cut grain from a windrow and delivering it to the thresher unit of the combine, or any other similar mechanism which is shiftable with respect to a second unit.

I claim:

1. In a combine, the combination of a harvester, a thresher, a conveyor movable with respect to the thresher for delivering grain from the harvester to the thresher, and a shield movably mounted on the thresher to conform to the movement of said conveyor to prevent loss of grain between the conveyor and the thresher.

2. In a combine, the combination of a harvester, a thresher, a transverse conveyor movable fore and aft relative to the thresher and tiltably mounted to rock about a generally transversely extending axis for delivering grain from the harvester to the thresher, and a shield for preventing leakage of grain between the conveyor and the thresher comprising a plate slidably mounted on the thresher to conform to the fore and aft movement of the conveyor and a second plate pivotally supported on said first named plate to conform to the tilting movement of said conveyor.

3. In a combine, the combination of a harvester, a thresher comprising a grain feeding compartment having an opening therein, a conveyor for delivering grain from the harvester to the grain feeding compartment extending into said opening and movable relatively thereto, and a movable shield mounted on the thresher and held against the conveyor for closing the space between the thresher and the conveyor.

4. In a combine, the combination of a harvester, a thresher, a conveyor movable fore and aft relative to the thresher for delivering grain from the harvester to the thresher, a shield for preventing leakage of grain between the conveyor and the thresher, and means for movably supporting the shield on the thresher comprising fore and aft extending means whereby said shield may move fore and aft to conform to the fore and aft movement of the conveyor.

5. In a combine, the combination of a harvester, a thresher, a conveyor movable fore and aft relative to the thresher and tiltable about a transversely extending axis for delivering grain from the harvester to the thresher, a shield for preventing leakage of grain between the conveyor and the thresher, comprising a plate slidingly supported on a fore and aft extending rod carried by the thresher, and a second plate pivotally supported on said first plate for movement about a transversely extending axis, whereby said shield may conform to the fore and aft and tilting movements of said conveyor.

6. In a combine, the combination of a harvester, a thresher, a conveyor movable fore and aft relative to the thresher and tiltable about a transversely extending axis for delivering grain from the harvester to the thresher, a shield for preventing leakage of grain between the conveyor and the thresher, and means for slidingly suporting the shield on the thresher whereby said shield moves in conformity to the fore and aft movement of the conveyor, said supporting means comprising a pair of fore and aft extending vertically spaced parallel rods.

7. In a combine, the combination of a harvester, a thresher having a grain compartment, a conveyor shiftable relative to said thresher and operative to deliver grain thereto, a shield carried by said thresher and cooperating with said conveyor to prevent leakage of grain between the conveyor and the thresher, brackets on said shield, and means on the thresher cooperating with said brackets for movably supporting the shield.

8. In a combine, the combination of a harvester, a thresher having a grain receiving compartment and a lateral opening communicating therewith, a conveyor extending into said opening and movable relatively thereto for delivering grain from the harvester to the thresher, a shield for preventing leakage of grain between the thresher and the conveyor at one end of said opening, means movably supporting said shield on the thresher comprising a pair of fore and aft extending members and brackets respectively embracing the upper and lower surfaces of said members, and means biasing said shield for movement along said members toward the conveyor.

9. In a combine, the combination of a harvester, a thresher, a conveyor for delivering grain from the harvester to the thresher and movable with respect thereto, a shield for preventing leakage of grain between the conveyor and the thresher comprising a plate slidingly supported on said thresher for fore and aft movement, and means connected with said thresher and with said plate for holding the forward edge thereof in contact with said conveyor regardless of the position of said conveyor relative to the thresher.

10. In a combine, the combination of a harvester, a thresher, a conveyor for delivering grain from the harvester to the thresher and movable fore and aft relative to the thresher and tiltable about a transversely extending axis, a shield for preventing leakage of grain between the conveyor and the thresher comprising a plate slidingly mounted on said thresher for fore and aft movement, and a second plate movably connected with said first plate and positioned between said first plate and said conveyor to contact with the latter, whereby said shield will conform to the fore and aft and tilting movements of the conveyor.

11. In a combine, the combination of a harvester, a thresher, a conveyor for delivering grain from the harvester to the thresher and movable fore and aft relative to the thresher and tiltable about a transversely extending axis, a shield for preventing leakage of grain between the conveyor and the thresher comprising a plate slidingly mounted on said thresher for fore and aft movement, a second plate pivotally connected with said first plate and positioned between said first plate and said conveyor to contact with the latter, whereby said shield will conform to the fore and aft and tilting movements of the conveyor, and means for holding the contacting edge of said second plate in contact with said conveyor in any position said conveyor may assume in such movements.

12. In a combine, the combination of a harvester, a thresher, a conveyor movable fore and aft relative to the thresher for delivering grain from the harvester to the thresher, a shield for preventing leakage of grain between the conveyor and the thresher slidingly mounted on the thresher for fore and aft movement relatively thereto, and spring means mounted on the thresher and connected with said shield for yieldingly pressing said shield against said conveyor upon fore and aft movement of said conveyor.

13. In a combine, the combination of a harvester, a thresher, a conveyor movable fore and aft relative to the thresher and tiltable about a transversely extending axis for delivering grain from the harvester to the thresher, a shield for preventing leakage of grain between the conveyor and the thresher comprising a plate slidingly mounted on said thresher for fore and aft movement, a second plate pivotally connected with said first plate and positioned between said first plate and said conveyor to contact with the latter, whereby said shield will conform to the fore and aft and tilting movements of the conveyor, and a compression spring connected with the thresher and with said first mentioned plate for holding the forward edge of said second plate in contact with said conveyor in any position said conveyor may assume in such movements.

14. In a combine, the combination of a harvester, a thresher, a conveyor movable fore and aft relative to the thresher and tiltable about a transversely extending axis for delivering grain from the harvester to the thresher, a shield for preventing leakage of grain between the conveyor and the thresher comprising a plate slidingly mounted on said thresher for fore and aft movement and a second plate carried by said first plate and pivotally connected therewith on a transversely extending axis, and yielding means for holding said shield in contact with said conveyor upon fore and aft movement of said conveyor, said second plate turning on its transverse axis whereby the position of said second plate conforms to the position of said conveyor in any angular position it may assume in its tilting movement.

15. In a combine, the combination of a harvester, a thresher having an opening in the side wall thereof, a conveyor having its upper end extending into said thresher through said opening and movable fore and aft and tiltable relative to the thresher for delivering grain from the harvester to the thresher, a shield for preventing leakage of grain between the conveyor and the thresher comprising a vertically extending plate slidingly mounted on the thresher for fore and aft movement, said plate having an inwardly and downwardly turned member adapted to contact with and slide on the lower edge of said opening, a second vertically extending plate pivotally connected with said first plate and positioned between said first plate and said conveyor to contact with the latter, and means for holding the forward edge of said second plate in contact with the side wall of the conveyor in any position the conveyor may assume in such movements.

16. In a combine, the combination of a harvester, a thresher having an opening in the side wall thereof, a conveyor having its upper end extending into said thresher through said opening for delivering grain from the harvester to the thresher, and movable relative to the thresher, a shield for preventing leakage of grain between the conveyor and the thresher comprising a vertically extending plate slidingly mounted on the thresher for fore and aft movement, said plate having an inwardly and downwardly turned member adapted to contact with and slide on the lower edge of said opening, a second vertically extending plate pivotally connected with said first plate and positioned between said first plate and said conveyor to contact with the latter, and yielding means for forcing said shield forwardly whereby the forward edge of said second plate is held in contact with the side wall of the conveyor in any position the conveyor may assume in such movements.

17. In a combine, the combination of a harvester, a thresher having an opening in the side wall thereof, a conveyor having its upper end extending into said thresher through said opening and movable fore and aft relative to the thresher and tiltable about a transversely extending axis for delivering grain from the harvester to the thresher, a shield for preventing leakage of grain between the conveyor and the thresher comprising a vertically extending plate slidably mounted on the thresher for fore and aft movement, said plate having an inwardly and downwardly turned member adapted to contact with and slide on the lower edge of said opening, a second vertically extending plate pivotally connected with said first plate and positioned between said first plate and said conveyor, said second plate having an outwardly turned flange member at its forward end adapted to contact with the side wall of the conveyor, and means for holding the flange member of the second plate in contact with the side wall of the conveyor in any position the conveyor may assume in such movements.

18. In a combine, the combination of a harvester, a thresher, a conveyor movable fore and aft relative to the thresher and tiltable about a transversely extending axis for delivering grain from the harvester to the thresher, a shield for preventing leakage of grain between the conveyor and the thresher comprising a plate slidingly mounted on said thresher for fore and aft movement, a second plate pivotally connected with said first plate and positioned between said first plate and said conveyor to contact with the latter, whereby said shield will conform to the fore and aft tilting movements of the conveyor, and spring means holding said shield in contact with the conveyor, said pivot cooperating to permit the forward edge of said second plate to lie in flush engagement with the side wall of the conveyor irrespective of any angular position it may assume in its tilting movement about said transversely extending axis.

In witness whereof, I hereunto subscribe my name this 22nd day of December, 1931.

LOUIS A. PARADISE.